(12) United States Patent
Bugenhagen

(10) Patent No.: US 8,189,468 B2
(45) Date of Patent: May 29, 2012

(54) SYSTEM AND METHOD FOR REGULATING MESSAGES BETWEEN NETWORKS

(75) Inventor: Michael K. Bugenhagen, Olathe, KS (US)

(73) Assignee: Embarq Holdings, Company, LLC, Overland Park, KS (US)

( * ) Notice: Subject to any disclaimer, the term of this patent is extended or adjusted under 35 U.S.C. 154(b) by 1024 days.

(21) Appl. No.: 11/586,169

(22) Filed: Oct. 25, 2006

(65) Prior Publication Data

US 2008/0167846 A1 Jul. 10, 2008

(51) Int. Cl.
*H04J 1/16* (2006.01)
*G06F 15/173* (2006.01)
*H04L 29/06* (2006.01)
*G06F 11/00* (2006.01)

(52) U.S. Cl. ............... 370/230.1; 370/235; 370/253; 709/224; 713/154; 726/22

(58) Field of Classification Search .................. None
See application file for complete search history.

(56) References Cited

U.S. PATENT DOCUMENTS

| | | | |
|---|---|---|---|
| 4,612,416 A | 9/1986 | Emerson et al. | |
| 4,771,448 A | 9/1988 | Koohgoli et al. | |
| 4,831,649 A | 5/1989 | Mejane | |
| 5,042,027 A | 8/1991 | Takase et al. | |
| 5,132,966 A | 7/1992 | Hayano et al. | |
| 5,408,465 A | 4/1995 | Gusella et al. | |
| 5,477,529 A | 12/1995 | Gingell | |
| 5,479,447 A | 12/1995 | Chow et al. | |
| 5,521,910 A | 5/1996 | Matthews | |
| 5,539,815 A | 7/1996 | Samba | |
| 5,574,934 A | 11/1996 | Mirashrafi et al. | |
| 5,581,482 A | 12/1996 | Wiedenmann et al. | |
| 5,621,663 A | 4/1997 | Skagerling | |
| 5,627,766 A | 5/1997 | Beaven | |
| 5,638,514 A | 6/1997 | Yoshida et al. | |
| 5,675,578 A | 10/1997 | Gruber et al. | |
| 5,680,425 A | 10/1997 | Morzano | |
| 5,726,979 A | 3/1998 | Henderson et al. | |
| 5,757,784 A | 5/1998 | Liebowitz | |
| 5,793,976 A | 8/1998 | Chen et al. | |
| 5,878,097 A | 3/1999 | Hase et al. | |
| 5,883,819 A | 3/1999 | Abu-Amara et al. | |
| 5,901,141 A | 5/1999 | Gruber et al. | |
| 5,903,558 A | 5/1999 | Jones et al. | |
| 5,917,821 A | 6/1999 | Gobuyan et al. | |
| 5,931,679 A | 8/1999 | Funahashi | |
| 5,953,318 A | 9/1999 | Nattkemper et al. | |
| 5,963,146 A | 10/1999 | Johnson et al. | |
| 5,970,064 A | 10/1999 | Clark et al. | |
| 6,011,798 A | 1/2000 | McAlpine | |

(Continued)

OTHER PUBLICATIONS

PCT International Search Report and Written Opinion for PCT/US07/15311, Date Mailed Apr. 21, 2008.

(Continued)

*Primary Examiner* — Melanie Jagannathan
(74) *Attorney, Agent, or Firm* — Patton Boggs LLP

(57) ABSTRACT

A system and method for interconnecting networks. In one embodiment, a message is received from a first network to be communicated to a target device of a second network. Data within the message is identified. A determination is made whether the data is allowable based on a policy. The message is communicated to the target device of the second network in response to determining the data is allowed.

15 Claims, 6 Drawing Sheets

U.S. PATENT DOCUMENTS

| | | |
|---|---|---|
| 6,047,326 A | 4/2000 | Kilkki |
| 6,055,578 A | 4/2000 | Williams et al. |
| 6,058,102 A | 5/2000 | Drysdale et al. |
| 6,064,673 A | 5/2000 | Anderson et al. |
| 6,081,505 A | 6/2000 | Kilikki |
| 6,108,306 A | 8/2000 | Kalkunte et al. |
| 6,115,393 A | 9/2000 | Engel et al. |
| 6,141,341 A | 10/2000 | Jones et al. |
| 6,167,025 A | 12/2000 | Hsing et al. |
| 6,185,198 B1 | 2/2001 | LaDue |
| 6,201,719 B1 | 3/2001 | He et al. |
| 6,209,033 B1 | 3/2001 | Datta et al. |
| 6,215,769 B1 | 4/2001 | Ghani et al. |
| 6,236,996 B1 | 5/2001 | Bapat et al. |
| 6,260,072 B1 | 7/2001 | Rodriguez-Moral |
| 6,269,401 B1 | 7/2001 | Fletcher et al. |
| 6,272,151 B1 | 8/2001 | Gupta et al. |
| 6,282,274 B1 | 8/2001 | Jain et al. |
| 6,327,620 B1 | 12/2001 | Tams et al. |
| 6,327,677 B1 | 12/2001 | Garg et al. |
| 6,338,046 B1 | 1/2002 | Saari et al. |
| 6,341,270 B1 | 1/2002 | Esposito et al. |
| 6,363,056 B1 | 3/2002 | Beigi et al. |
| 6,370,114 B1 | 4/2002 | Gullicksen et al. |
| 6,381,221 B1 | 4/2002 | Legouet-Camus et al. |
| 6,381,228 B1 | 4/2002 | Prieto et al. |
| 6,384,744 B1 | 5/2002 | Philyaw et al. |
| 6,389,005 B1 | 5/2002 | Cruickshank |
| 6,397,359 B1 | 5/2002 | Chandra et al. |
| 6,401,121 B1 | 6/2002 | Yoshida et al. |
| 6,404,746 B1 | 6/2002 | Cave et al. |
| 6,421,356 B2 | 7/2002 | Carter et al. |
| 6,434,618 B1 | 8/2002 | Cohen et al. |
| 6,453,359 B1 | 9/2002 | Bender et al. |
| 6,460,055 B1 | 10/2002 | Midgley et al. |
| 6,473,793 B1 | 10/2002 | Dillon et al. |
| 6,477,590 B1 | 11/2002 | Habusha et al. |
| 6,493,547 B1 | 12/2002 | Raith |
| 6,502,131 B1 | 12/2002 | Vaid et al. |
| 6,529,475 B1 | 3/2003 | Wan et al. |
| 6,530,032 B1 | 3/2003 | Shew et al. |
| 6,535,504 B1 | 3/2003 | Johnson et al. |
| 6,542,466 B1 | 4/2003 | Pashtan et al. |
| 6,549,946 B1 | 4/2003 | Fisher et al. |
| 6,560,199 B1 | 5/2003 | Hoshino |
| 6,594,268 B1 | 7/2003 | Aukia et al. |
| 6,594,277 B1 | 7/2003 | Chiang et al. |
| 6,597,683 B1 | 7/2003 | Gehring et al. |
| 6,614,781 B1 | 9/2003 | Elliott et al. |
| 6,615,261 B1 | 9/2003 | Smorgrav |
| 6,628,629 B1 | 9/2003 | Jorgensen |
| 6,633,835 B1 | 10/2003 | Moran et al. |
| 6,646,987 B1 | 11/2003 | Qaddoura |
| 6,651,030 B2 | 11/2003 | Victor et al. |
| 6,654,803 B1 | 11/2003 | Rochford et al. |
| 6,657,957 B1 | 12/2003 | Cheung et al. |
| 6,665,264 B1 | 12/2003 | Davison et al. |
| 6,665,714 B1 | 12/2003 | Blumenau et al. |
| 6,678,250 B1 | 1/2004 | Grabelsky et al. |
| 6,678,524 B1 | 1/2004 | Hansson et al. |
| 6,684,253 B1 | 1/2004 | Whitaker et al. |
| 6,690,646 B1 | 2/2004 | Fichou et al. |
| 6,721,405 B1 | 4/2004 | Nolting et al. |
| 6,741,563 B2 | 5/2004 | Packer |
| 6,741,572 B1 | 5/2004 | Graves et al. |
| 6,748,247 B1 | 6/2004 | Ramakrishnan et al. |
| 6,751,777 B2 | 6/2004 | Bates et al. |
| 6,754,221 B1 | 6/2004 | Whitcher et al. |
| 6,757,255 B1 | 6/2004 | Aoki et al. |
| 6,763,380 B1 | 7/2004 | Mayton et al. |
| 6,765,864 B1 | 7/2004 | Natarajan et al. |
| 6,785,259 B2 | 8/2004 | Le et al. |
| 6,785,285 B1 | 8/2004 | Romana et al. |
| 6,798,755 B2 | 9/2004 | Lillie et al. |
| 6,798,786 B1 | 9/2004 | Lo et al. |
| 6,804,240 B1 | 10/2004 | Shirakawa et al. |
| 6,807,515 B2 | 10/2004 | Vogel et al. |
| 6,816,463 B2 | 11/2004 | Cooper et al. |
| 6,836,800 B1 | 12/2004 | Sweet et al. |
| 6,839,070 B2 | 1/2005 | Meandzija et al. |
| 6,839,356 B2 | 1/2005 | Barany et al. |
| 6,839,747 B1 | 1/2005 | Blumenau et al. |
| 6,868,094 B1 | 3/2005 | Bordonaro et al. |
| 6,891,822 B1 | 5/2005 | Gubbi et al. |
| 6,892,336 B1 | 5/2005 | Giorgetta et al. |
| 6,912,231 B2 | 6/2005 | White et al. |
| 6,925,060 B2 | 8/2005 | Mangin |
| 6,925,424 B2 | 8/2005 | Jones et al. |
| 6,925,493 B1 | 8/2005 | Barkan et al. |
| 6,931,354 B2 | 8/2005 | Jones et al. |
| 6,934,249 B1 | 8/2005 | Bertin et al. |
| 6,934,251 B2 | 8/2005 | Ono |
| 6,934,749 B1 | 8/2005 | Black et al. |
| 6,937,713 B1 | 8/2005 | Kung et al. |
| 6,940,832 B2 | 9/2005 | Saadawi et al. |
| 6,944,673 B2 | 9/2005 | Malan et al. |
| 6,947,379 B1 | 9/2005 | Gleichauf et al. |
| 6,950,407 B1 | 9/2005 | Huddle |
| 6,965,614 B1 | 11/2005 | Osterhout et al. |
| 6,973,622 B1 | 12/2005 | Rappaport et al. |
| 6,975,617 B2 | 12/2005 | Walker et al. |
| 6,978,223 B2 | 12/2005 | Milliken |
| 6,985,901 B1 | 1/2006 | Sachse et al. |
| 6,999,419 B2 | 2/2006 | Ise et al. |
| 7,002,992 B1 | 2/2006 | Shaffer et al. |
| 7,006,526 B1 | 2/2006 | Biedermann |
| 7,007,107 B1 | 2/2006 | Ivchenko et al. |
| 7,013,322 B2 | 3/2006 | Lahr |
| 7,013,338 B1 | 3/2006 | Nag et al. |
| 7,013,349 B2 | 3/2006 | Idsinga |
| 7,020,082 B2 | 3/2006 | Bhagavath et al. |
| 7,020,085 B2 | 3/2006 | Mimura et al. |
| 7,023,839 B1 | 4/2006 | Shaffer et al. |
| 7,027,400 B2 | 4/2006 | O'Neill |
| 7,035,220 B1 | 4/2006 | Simcoe |
| 7,035,291 B2 | 4/2006 | Grinfeld |
| 7,039,015 B1 | 5/2006 | Vallone et al. |
| 7,039,709 B1 | 5/2006 | Beadle et al. |
| 7,042,841 B2 | 5/2006 | Abdelilah et al. |
| 7,051,098 B2 | 5/2006 | Masters et al. |
| 7,058,727 B2 | 6/2006 | Dingsor et al. |
| 7,061,856 B2 | 6/2006 | Banerjee |
| 7,062,259 B1 | 6/2006 | Dispensa et al. |
| 7,068,607 B2 | 6/2006 | Partain et al. |
| 7,082,315 B2 | 7/2006 | Bar-on |
| 7,088,678 B1 | 8/2006 | Freed et al. |
| 7,092,696 B1 | 8/2006 | Hosain et al. |
| 7,096,260 B1 | 8/2006 | Zavalkovsky et al. |
| 7,099,879 B2 | 8/2006 | Tacaille et al. |
| 7,099,942 B1 | 8/2006 | Wilson et al. |
| 7,100,005 B2 | 8/2006 | Pearl |
| 7,107,273 B2 | 9/2006 | Ohata et al. |
| 7,124,211 B2 | 10/2006 | Dickson et al. |
| 7,127,617 B2 | 10/2006 | Wiederin et al. |
| 7,142,516 B2 | 11/2006 | Lev et al. |
| 7,180,866 B1 | 2/2007 | Chartre et al. |
| 7,184,401 B2 | 2/2007 | Foore et al. |
| 7,184,777 B2 | 2/2007 | Diener et al. |
| 7,194,002 B2 | 3/2007 | Zhang et al. |
| 7,197,546 B1 | 3/2007 | Bagga et al. |
| 7,206,593 B1 | 4/2007 | Yarkosky et al. |
| 7,209,473 B1 | 4/2007 | Mohaban et al. |
| 7,222,147 B1 | 5/2007 | Black et al. |
| 7,222,190 B2 | 5/2007 | Klinker et al. |
| 7,224,974 B2 | 5/2007 | Benco et al. |
| 7,246,045 B1 | 7/2007 | Rappaport et al. |
| 7,246,159 B2 | 7/2007 | Aggarwal et al. |
| 7,248,560 B1 | 7/2007 | Blankenship et al. |
| 7,248,604 B2 | 7/2007 | Sugar et al. |
| 7,257,080 B2 | 8/2007 | Martin |
| 7,260,635 B2 | 8/2007 | Pandya et al. |
| 7,263,067 B2 | 8/2007 | Sreemanthula et al. |
| 7,266,122 B1 | 9/2007 | Hogg et al. |
| 7,266,754 B2 * | 9/2007 | Shah et al. ............ 714/776 |
| 7,277,913 B2 | 10/2007 | Kashyap |
| 7,283,474 B1 | 10/2007 | Bergenwall |
| 7,292,531 B1 | 11/2007 | Hill |

| Patent/Publication | Date | Inventor |
|---|---|---|
| 7,304,942 B1 | 12/2007 | Malladi et al. |
| 7,307,989 B2 | 12/2007 | Ofek |
| 7,310,334 B1 | 12/2007 | FitzGerald et al. |
| 7,313,129 B1 | 12/2007 | Bova et al. |
| 7,330,434 B2 | 2/2008 | Murooka et al. |
| 7,349,960 B1 | 3/2008 | Pothier et al. |
| 7,360,083 B1 | 4/2008 | Ragireddy et al. |
| 7,369,498 B1 | 5/2008 | Ma et al. |
| 7,376,731 B2 | 5/2008 | Khan et al. |
| 7,385,997 B2 | 6/2008 | Gorti et al. |
| 7,389,537 B1* | 6/2008 | Callon et al. .................... 726/22 |
| 7,391,721 B1 | 6/2008 | Holbrook |
| 7,406,029 B1 | 7/2008 | Ciancaglini et al. |
| 7,411,966 B2 | 8/2008 | Bruckner et al. |
| 7,412,507 B2 | 8/2008 | Saxena et al. |
| 7,417,949 B2 | 8/2008 | Weller et al. |
| 7,450,928 B1 | 11/2008 | Henry et al. |
| 7,460,493 B1 | 12/2008 | Dhanoa et al. |
| 7,463,634 B1 | 12/2008 | Hansen |
| 7,471,653 B2 | 12/2008 | McConnell et al. |
| 7,472,192 B2 | 12/2008 | DeFerranti et al. |
| 7,477,657 B1 | 1/2009 | Murphy et al. |
| 7,483,437 B1 | 1/2009 | Mohaban |
| 7,499,407 B2 | 3/2009 | Holness et al. |
| 7,502,841 B2 | 3/2009 | Small et al. |
| 7,505,412 B2 | 3/2009 | Miyake et al. |
| 7,515,542 B2 | 4/2009 | Hertoghs et al. |
| 7,519,700 B1 | 4/2009 | Sapsford et al. |
| 7,519,725 B2 | 4/2009 | Alvarez et al. |
| 7,529,192 B2 | 5/2009 | Labovitz |
| 7,535,913 B2 | 5/2009 | Minami et al. |
| 7,539,241 B1 | 5/2009 | Dick |
| 7,542,440 B2 | 6/2009 | Rajkotia |
| 7,587,203 B2 | 9/2009 | Shahidi et al. |
| 7,590,718 B2 | 9/2009 | Gilmour et al. |
| 7,593,321 B2 | 9/2009 | Galand et al. |
| 7,602,725 B2 | 10/2009 | Vaught |
| 7,613,118 B2 | 11/2009 | Appanna et al. |
| 7,616,573 B2 | 11/2009 | Olesinski et al. |
| 7,623,550 B2 | 11/2009 | Forbes |
| 7,627,627 B2 | 12/2009 | Helliwell et al. |
| 7,643,414 B1 | 1/2010 | Minhazuddin |
| 7,649,837 B1 | 1/2010 | Puuskari |
| 7,653,005 B2 | 1/2010 | Zou et al. |
| 7,653,725 B2 | 1/2010 | Yahiro et al. |
| 7,668,953 B1* | 2/2010 | Sinclair et al. ................ 709/224 |
| 7,684,332 B2 | 3/2010 | Ray et al. |
| 7,715,353 B2 | 5/2010 | Jain et al. |
| 7,751,780 B2 | 7/2010 | Saidi et al. |
| 7,802,008 B2 | 9/2010 | Akinlar et al. |
| 7,808,918 B2 | 10/2010 | Bugenhagen |
| 7,843,831 B2 | 11/2010 | Morrill et al. |
| 7,852,749 B2 | 12/2010 | Mickle et al. |
| 7,889,660 B2 | 2/2011 | Bugenhagen |
| 7,940,735 B2 | 5/2011 | Kozisek et al. |
| 7,948,909 B2 | 5/2011 | Bugenhagen |
| 8,000,318 B2 | 8/2011 | Wiley et al. |
| 8,015,294 B2 | 9/2011 | Bugenhagen |
| 2001/0002195 A1 | 5/2001 | Fellman et al. |
| 2001/0006899 A1 | 7/2001 | Khullar et al. |
| 2001/0036181 A1 | 11/2001 | Rogers |
| 2001/0038610 A1 | 11/2001 | Decker et al. |
| 2002/0015386 A1 | 2/2002 | Kajiwara |
| 2002/0032871 A1* | 3/2002 | Malan et al. .................... 713/201 |
| 2002/0044528 A1 | 4/2002 | Pogrebinsky et al. |
| 2002/0068543 A1 | 6/2002 | Shah |
| 2002/0075869 A1 | 6/2002 | Shah et al. |
| 2002/0093948 A1 | 7/2002 | Dertz et al. |
| 2002/0107966 A1 | 8/2002 | Baudot et al. |
| 2002/0115429 A1 | 8/2002 | Deluca et al. |
| 2002/0129295 A1 | 9/2002 | Nishioka et al. |
| 2002/0145982 A1 | 10/2002 | Talpade et al. |
| 2002/0145998 A1 | 10/2002 | Hagirahim |
| 2002/0165957 A1 | 11/2002 | Devoe et al. |
| 2002/0176131 A1 | 11/2002 | Walters et al. |
| 2002/0186660 A1 | 12/2002 | Bahadiroglu |
| 2002/0186665 A1 | 12/2002 | Chaffee et al. |
| 2002/0191618 A1 | 12/2002 | Mattathil |
| 2003/0005144 A1 | 1/2003 | Engel et al. |
| 2003/0012138 A1 | 1/2003 | Abdelilah et al. |
| 2003/0046388 A1 | 3/2003 | Milliken |
| 2003/0064720 A1 | 4/2003 | Valins et al. |
| 2003/0067877 A1 | 4/2003 | Sivakumar et al. |
| 2003/0067884 A1 | 4/2003 | Abler et al. |
| 2003/0088671 A1 | 5/2003 | Klinker et al. |
| 2003/0100308 A1 | 5/2003 | Rusch |
| 2003/0118029 A1 | 6/2003 | Maher, III et al. |
| 2003/0120594 A1 | 6/2003 | Shaginaw et al. |
| 2003/0128692 A1 | 7/2003 | Mitsumori et al. |
| 2003/0137997 A1 | 7/2003 | Keating |
| 2003/0142625 A1 | 7/2003 | Wan et al. |
| 2003/0147386 A1 | 8/2003 | Zhang et al. |
| 2003/0172291 A1* | 9/2003 | Judge et al. .................... 713/200 |
| 2003/0182410 A1 | 9/2003 | Balan et al. |
| 2003/0182432 A1 | 9/2003 | Lawson |
| 2003/0185210 A1 | 10/2003 | McCormack |
| 2003/0189900 A1 | 10/2003 | Barany et al. |
| 2003/0189943 A1 | 10/2003 | Gorti et al. |
| 2003/0198187 A1 | 10/2003 | Mellquist et al. |
| 2003/0198209 A1 | 10/2003 | Schwengler et al. |
| 2003/0235209 A1 | 12/2003 | Garg et al. |
| 2003/0236745 A1 | 12/2003 | Hartsell et al. |
| 2004/0025172 A1 | 2/2004 | Bian et al. |
| 2004/0032860 A1 | 2/2004 | Mundra et al. |
| 2004/0034793 A1 | 2/2004 | Yuan |
| 2004/0049596 A1 | 3/2004 | Schuehler et al. |
| 2004/0054680 A1 | 3/2004 | Kelley et al. |
| 2004/0073641 A1 | 4/2004 | Minhazuddin et al. |
| 2004/0073690 A1 | 4/2004 | Hepworth et al. |
| 2004/0088244 A1 | 5/2004 | Bartter et al. |
| 2004/0098473 A1 | 5/2004 | Yodaiken |
| 2004/0101302 A1 | 5/2004 | Kim et al. |
| 2004/0103216 A1 | 5/2004 | Lane |
| 2004/0110507 A1 | 6/2004 | Ramakrishnan et al. |
| 2004/0117502 A1 | 6/2004 | Rosengard et al. |
| 2004/0139106 A1 | 7/2004 | Bachman et al. |
| 2004/0153382 A1 | 8/2004 | Boccuzzi et al. |
| 2004/0155899 A1 | 8/2004 | Conrad |
| 2004/0158704 A1 | 8/2004 | Oates et al. |
| 2004/0160979 A1 | 8/2004 | Pepin et al. |
| 2004/0209595 A1 | 10/2004 | Bekanich |
| 2004/0230572 A1 | 11/2004 | Omoigui |
| 2004/0240405 A1 | 12/2004 | Okazaki |
| 2004/0240454 A1 | 12/2004 | Yamauchi et al. |
| 2004/0242219 A1 | 12/2004 | Oie et al. |
| 2004/0246895 A1 | 12/2004 | Feyerabend |
| 2004/0252718 A1 | 12/2004 | Miyamoto |
| 2004/0258226 A1 | 12/2004 | Host |
| 2004/0261116 A1 | 12/2004 | Mckeown et al. |
| 2004/0264961 A1 | 12/2004 | Nam et al. |
| 2004/0267948 A1 | 12/2004 | Oliver et al. |
| 2005/0002331 A1 | 1/2005 | Nolle et al. |
| 2005/0025059 A1 | 2/2005 | Rajan et al. |
| 2005/0027851 A1 | 2/2005 | McKeown et al. |
| 2005/0027870 A1 | 2/2005 | Trebes, Jr. |
| 2005/0043026 A1 | 2/2005 | Brok et al. |
| 2005/0071494 A1 | 3/2005 | Rundquist et al. |
| 2005/0075957 A1 | 4/2005 | Pincus et al. |
| 2005/0083886 A1 | 4/2005 | Ikeda |
| 2005/0086336 A1 | 4/2005 | Haber |
| 2005/0089040 A1 | 4/2005 | Kim |
| 2005/0089043 A1 | 4/2005 | Seckin et al. |
| 2005/0135379 A1 | 6/2005 | Callaway et al. |
| 2005/0138517 A1 | 6/2005 | Monitzer |
| 2005/0157751 A1 | 7/2005 | Rabie et al. |
| 2005/0163047 A1 | 7/2005 | McGregor et al. |
| 2005/0169186 A1 | 8/2005 | Qiu et al. |
| 2005/0180338 A1 | 8/2005 | Pirila et al. |
| 2005/0181814 A1 | 8/2005 | Okamoto |
| 2005/0182847 A1 | 8/2005 | Jawad Pirzada et al. |
| 2005/0201414 A1 | 9/2005 | Awais |
| 2005/0204162 A1* | 9/2005 | Rayes et al. .................... 713/201 |
| 2005/0208950 A1 | 9/2005 | Hasse |
| 2005/0220035 A1 | 10/2005 | Ling et al. |
| 2005/0223097 A1 | 10/2005 | Ramsayer et al. |
| 2005/0228885 A1 | 10/2005 | Winfield et al. |
| 2005/0235058 A1 | 10/2005 | Rackus et al. |
| 2005/0238026 A1 | 10/2005 | Wu et al. |

| Publication No. | Date | Inventor |
|---|---|---|
| 2005/0249124 A1 | 11/2005 | Elie-Dit-Cosaque et al. |
| 2005/0249206 A1 | 11/2005 | Wybenga et al. |
| 2005/0254435 A1 | 11/2005 | Moakley et al. |
| 2005/0260993 A1 | 11/2005 | Lovell |
| 2005/0262240 A1 | 11/2005 | Drees et al. |
| 2005/0289232 A1 | 12/2005 | Ebert |
| 2006/0002370 A1 | 1/2006 | Rabie et al. |
| 2006/0015773 A1 | 1/2006 | Singh |
| 2006/0020700 A1 | 1/2006 | Qiu et al. |
| 2006/0023638 A1 | 2/2006 | Monaco |
| 2006/0023642 A1 | 2/2006 | Roskowski et al. |
| 2006/0072555 A1 | 4/2006 | St Hilaire et al. |
| 2006/0092976 A1 | 5/2006 | Lakshman et al. |
| 2006/0094440 A1 | 5/2006 | Meier et al. |
| 2006/0104264 A1 | 5/2006 | Cho |
| 2006/0106919 A1 | 5/2006 | Watkinson et al. |
| 2006/0109839 A1 | 5/2006 | Hino et al. |
| 2006/0114818 A1 | 6/2006 | Canali et al. |
| 2006/0114888 A1 | 6/2006 | Schuman |
| 2006/0135118 A1 | 6/2006 | Claussen et al. |
| 2006/0143098 A1 | 6/2006 | Lazaridis |
| 2006/0159006 A1 | 7/2006 | Yeon et al. |
| 2006/0159008 A1 | 7/2006 | Sridhar et al. |
| 2006/0164982 A1 | 7/2006 | Arora et al. |
| 2006/0171314 A1 | 8/2006 | Qian et al. |
| 2006/0205410 A1 | 9/2006 | Black |
| 2006/0209685 A1 | 9/2006 | Rahman et al. |
| 2006/0218059 A1 | 9/2006 | Hartley et al. |
| 2006/0239204 A1 | 10/2006 | Bordonaro et al. |
| 2006/0239296 A1 | 10/2006 | Jinzaki et al. |
| 2006/0242309 A1 | 10/2006 | Damick |
| 2006/0244818 A1 | 11/2006 | Majors et al. |
| 2006/0245369 A1 | 11/2006 | Schimmelpfeng et al. |
| 2006/0251050 A1 | 11/2006 | Karlsson |
| 2006/0256721 A1 | 11/2006 | Yarlagadda et al. |
| 2006/0256810 A1 | 11/2006 | Yarlagadda et al. |
| 2006/0262772 A1 | 11/2006 | Guichard et al. |
| 2006/0270385 A1 | 11/2006 | Morris |
| 2006/0271677 A1 | 11/2006 | Mercier |
| 2006/0285501 A1 | 12/2006 | Damm |
| 2006/0286980 A1 | 12/2006 | Hua |
| 2007/0014290 A1 | 1/2007 | Dec et al. |
| 2007/0025255 A1 | 2/2007 | Noble |
| 2007/0025258 A1 | 2/2007 | Chen |
| 2007/0036151 A1 | 2/2007 | Baeder |
| 2007/0076754 A1 | 4/2007 | Krishnaswamy |
| 2007/0083643 A1 | 4/2007 | Arndt et al. |
| 2007/0094374 A1 | 4/2007 | Karia et al. |
| 2007/0097985 A1 | 5/2007 | Lee |
| 2007/0117538 A1 | 5/2007 | Weiser et al. |
| 2007/0133403 A1 | 6/2007 | Hepworth et al. |
| 2007/0133441 A1 | 6/2007 | Kang et al. |
| 2007/0140202 A1 | 6/2007 | Calhoun et al. |
| 2007/0140301 A1 | 6/2007 | Kailash et al. |
| 2007/0147247 A1 | 6/2007 | Kalonji et al. |
| 2007/0171937 A1 | 7/2007 | Boatright et al. |
| 2007/0180086 A1* | 8/2007 | Fang et al. ............... 709/223 |
| 2007/0180142 A1 | 8/2007 | Small et al. |
| 2007/0189247 A1 | 8/2007 | Wang et al. |
| 2007/0201485 A1 | 8/2007 | Rabipour |
| 2007/0211717 A1 | 9/2007 | Capps et al. |
| 2007/0217377 A1 | 9/2007 | Takeuchi |
| 2007/0223388 A1 | 9/2007 | Arad et al. |
| 2007/0223493 A1 | 9/2007 | Sridhar et al. |
| 2007/0237085 A1 | 10/2007 | Tirumalai et al. |
| 2007/0263535 A1 | 11/2007 | Shabtay |
| 2007/0268817 A1 | 11/2007 | Smallegange et al. |
| 2007/0286195 A1 | 12/2007 | Ilnickl et al. |
| 2007/0298763 A1 | 12/2007 | Clayton |
| 2008/0002669 A1 | 1/2008 | O'Brien et al. |
| 2008/0013531 A1 | 1/2008 | Elliott et al. |
| 2008/0014908 A1 | 1/2008 | Vasant |
| 2008/0016402 A1 | 1/2008 | Harel et al. |
| 2008/0043716 A1 | 2/2008 | Toombs et al. |
| 2008/0049625 A1 | 2/2008 | Edwards et al. |
| 2008/0049637 A1 | 2/2008 | Morrill et al. |
| 2008/0049745 A1 | 2/2008 | Edwards et al. |
| 2008/0049775 A1 | 2/2008 | Morrill et al. |
| 2008/0062986 A1 | 3/2008 | Shand et al. |
| 2008/0101338 A1 | 5/2008 | Reynolds et al. |
| 2008/0101364 A1 | 5/2008 | Chow et al. |
| 2008/0112333 A1 | 5/2008 | Busch et al. |
| 2008/0279183 A1 | 11/2008 | Wiley et al. |
| 2009/0059881 A1 | 3/2009 | Theobold et al. |
| 2009/0070454 A1 | 3/2009 | McKinnon, III et al. |
| 2009/0086649 A1 | 4/2009 | Van Der Burg et al. |
| 2009/0116497 A1 | 5/2009 | Varma et al. |
| 2009/0177742 A1 | 7/2009 | Rhoads et al. |
| 2009/0201828 A1 | 8/2009 | Samuels et al. |
| 2009/0252148 A1 | 10/2009 | Dolganow et al. |
| 2010/0135186 A1 | 6/2010 | Choong et al. |
| 2010/0246393 A1 | 9/2010 | Chamas et al. |

OTHER PUBLICATIONS

PCT International Search Report and Written Opinion for PCT/US07/15299, Date Mailed Feb. 6, 2008.

PCT International Search Report and Written Opinion for PCT/US07/15203, Date Mailed Feb. 5, 2008.

PCT International Search Report and Written Opinion for PCT/US07/15252, Date Mailed Mar. 21, 2008.

PCT International Search Report and Written Opinion for PCT/US07/81980, Date Mailed Mar. 11, 2008.

ITU-T Newslog, Operators Given Performance Management for Ethernet with New Standard, [Retrieved from ITU-T Newslog, <URL:http://www.itu.int/ITU-T/newslog/default, date, Feb. 8, 2006, aspx>] Feb. 6, 2006.

PCT International Search Report and Written Opinion for PCT/US07/81971, Date Mailed Mar. 11, 2008.

PCT International Search Report and Written Opinion for PCT/US07/18549, Date Mailed May 8, 2008.

U.S. Non-Final Office Action Dated Jul. 9, 2008; U.S. Appl. No. 11/479,751, filed Jun. 30, 2006.

Fujitsu: Ethernet Service OAM; Overview, Applications, Deployment, and Issues; publication date: Mar. 2, 2006.

Ng, See Leng et al. "End-to-end Based QoS provisioning in an ALL-IP Network" Sep. 23-26, 2005.

Manousos, Michael et al. "Voice-Quality Monitoring and Control of VOIP" Jul. 2005.

www.sipcenter.com "What is SIP?" Jun. 2001.

Pangalos, P.A. et al "End-to-end SIP based real time application adaptation during unplanned vertical handovers," Global Telecommunications Conference, 2001. Globecom '01.IEEE, vol. 6, No., pp. 3488-3493 vol. 6, 2001.

Yoshimura, T. et al. "Rate and robustness control with RTP monitoring agent for mobile multimedia streaming," Communications, 2002. ICC 2002. IEEE International Conference on, vol. 4, No., pp. 2513-2517 vol. 4, 2002.

J. Rosenburg et al. "SIP: Session Initiation Protocol" IETF RFC 3261, Jun. 2002.

International Telecommunication Union, H.323 Series H. Audiovisual and Multimedia Systems, Infrastructure of audiovisual services—Systems and terminal equipment for audiovisual services—Visual telephone systems and equipment for local area networks which provide a non-guaranteed quality of service, Nov. 1996, ITU; cover page, pp. i-v, pages.

Non-Final Office Action date mailed Jul. 9, 2008 for U.S. Appl. No. 11/479,751.

Response filed Nov. 7, 2008 Non-Final Office Action date mailed Jul. 9, 2008 for U.S. Appl. No. 11/479,751.

Final Office Action date mailed Jan. 23, 2009 for U.S. Appl. No. 11/479,751.

RCE/Response filed May 27, 2009 Final Office Action date mailed Jan. 23, 2009 for U.S. Appl. No. 11/479,751.

Non-Final Office Action date mailed Aug. 20, 2009 for U.S. Appl. No. 11/479,751.

Non-Final Office Action date mailed Sep. 1, 2009 for U.S. Appl. No. 11/809,404.

Non-Final Office Action date mailed Aug. 17, 2009 for U.S. Application No. 11/809,405.

Non-Final Office Action date mailed Sep. 9, 2009 for U.S. Appl. No. 11/809,911.

Non-Final Office Action date mailed Feb. 17, 2009 for U.S. Appl. No. 11/583,765.
Response filed May 18, 2009 Non-Final Office Action date mailed Feb. 17, 2009 for U.S. Appl. No. 11/583,765.
Non-Final Office Action date mailed Aug. 6, 2009 for U.S. Appl. No. 11/809,398.
Non-Final Office Action date mailed Aug. 6, 2009 for U.S. Appl. No. 11/809,912.
Non-Final Office Action date mailed Mar. 30, 2009 for U.S. Appl. No. 11/583,288.
Response filed May 18, 2009 to Non-Final Office Action date mailed Mar. 30, 2009 for U.S. Appl. No. 11/583,288.
Non-Final Office Action date mailed Jun. 23, 2009 for U.S. Appl. No. 11/809,535.
Non-Final Office Action date mailed Aug. 17, 2009 for U.S. Appl. No. 11/809,917.
Non-Final Office Action date mailed Jun. 11, 2009 for U.S. Appl. No. 11/809,402.
Response filed Sep. 9, 2009 to Non-Final Office Action date mailed Jun. 11, 2009 for U.S. Appl. No. 11/809,402.
Non-Final Office Action date mailed Jun. 25, 2009 for U.S. Appl. No. 11/809,408.
Non-Final Office Action date mailed Nov. 12, 2008 for U.S. Appl. No. 11/809,395.
Response filed Apr. 13, 2009 to Non-Final Office Action date mailed Nov. 12, 2008 for U.S. Appl. No. 11/809,395.
Final Office Action date mailed Aug. 7, 2009 for U.S. Appl. No. 11/809,395.
Non-Final Office Action date mailed Nov. 14, 2008 for U.S. Appl. No. 11/809,913.
Response filed Apr. 14, 2009 to Non-Final Office Action date mailed Nov. 14, 2008 for U.S. Appl. No. 11/809,913.
Final Office Action date mailed Jul. 8, 2009 for U.S. Appl. No. 11/809,913.
Non-Final Office Action date mailed Jun. 11, 2009 for U.S. Appl. No. 11/809,407.
Response filed Sep. 9, 2009 to Non-Final Office Action date mailed Jun. 11, 2009 for U.S. Appl. No. 11/809,407.
Non-Final Office Action date mailed Jun. 10, 2009 for U.S. Appl. No. 11/809,394.
Response filed Sep. 9, 2009 to Non-Final Office Action date mailed Jun. 10, 2009 for U.S. Appl. No. 11/809,394.
Non-Final Office Action date mailed Jul. 23, 2009 for U.S. Appl. No. 11/809,883.
Non-Final Office Action date mailed Aug. 6, 2009 for U.S. Appl. No. 11/809,884.
Non-Final Office Action date mailed Aug. 20, 2009 for U.S. Appl. No. 11/809,915.
Non-Final Office Action date mailed Aug. 5, 2009 for U.S. Appl. No. 11/809,888.
Non-Final Office Action date mailed Jun. 11, 2009 for U.S. Appl. No. 11/809,403.
Response filed Sep. 10, 2009 to Non-Final Office Action date mailed Jun. 11, 2009 for U.S. Appl. No. 11/809,403.
Interview Summary date mailed Dec. 14, 2010 for U.S. Appl. No. 11/479,751.
Response filed Nov. 30, 2010 for U.S. Appl. No. 11/809,398.
Response filed Nov. 29, 2010 for U.S. Appl. No. 11/583,288.
Non-Final Office Action date mailed Dec. 7, 2010 for U.S. Appl. No. 11/809,535.
Response filed Dec. 1, 2010 for U.S. Appl. No. 11/809,400.
Final Office Action date mailed Nov. 23, 2010 for U.S. Appl. No. 11/809,917.
Response filed Dec. 17, 2010 for U.S. Appl. No. 11/809,402.
RCE/Response filed Dec. 1, 2010 for U.S. Appl. No. 11/809,538.
Response filed Dec. 7, 2010 for U.S. Appl. No. 11/809,408.
RCE/Response filed Dec. 1, 2010 for U.S. Appl. No. 11/809,887.
Response filed Dec. 9, 2010 for U.S. Appl. No. 11/809,392.
Response filed Dec. 2, 2010 for U.S. Appl. No. 11/809,886.
Non-Final Office Action mailed Dec. 23, 2010 for U.S. Appl. No. 11/809,914.
Response filed Nov. 5, 2010 for U.S. Appl. No. 11/809,406.
Response filed Dec. 17, 2010 for U.S. Appl. No. 12/633,361.
Non-Final Office Action date mailed Dec. 7, 2010 for U.S. Appl. No. 11/809,394.
RCE/Response filed Dec. 1, 2010 for U.S. Appl. No. 11/809,883.
Non-Final Office Action date mailed Nov. 30, 2010 for U.S. Appl. No. 11/809,884.
Non-Final Office Action date mailed Nov. 26, 2010 for U.S. Appl. No. 12/421,525.
Notice of Allowance date mailed Nov. 2, 2010 for U.S. Appl. No. 11/894,879.
Non-Final Office Action date mailed Oct. 26, 2010 for U.S. Appl. No. 11/809,539.
RCE/Response filed Nov. 11, 2010 for U.S. Appl. No. 11/809,535.
RCE/Response filed Nov. 5, 2010 for U.S. Appl. No. 11/809,407.
RCE/Response filed Oct. 26, 2010 for U.S. Appl. No. 11/809,394.
RCE/Response filed Oct. 29, 2010 for U.S. Appl. No. 11/809,393.
Appeal filed Oct. 22, 2010 for U.S. Appl. No. 11/809,914.
Appeal filed Nov. 16, 2010 for U.S. Appl. No. 11/809,534.
Appeal filed Nov. 4, 2010 for U.S. Appl. No. 11/809,916.
Response filed Nov. 4, 2010 for U.S. Appl. No. 11/809,403.
Pre-Appeal Decision Jun. 23, 2010 for U.S. Appl. No. 11/479,751.
Office Action communication date mailed Aug. 24, 2010 for U.S. Appl. No. 11/479,751.
RCE filed Aug. 9, 2010 for U.S. Appl. No. 11/583,765.
Non-Final Office Action date mailed Aug. 30, 2010 for U.S. Appl. No. 11/809,398.
Notice of Pre-Appeal Brief decision Aug. 23, 2010 for U.S. Appl. No. 11/809,539.
Non-Final Office Action date mailed Aug. 31, 2010 for U.S. Appl. No. 11/583,288.
Non-Final Office Action date mailed Sep. 1, 2010 for U.S. Appl. No. 11/809,400.
Response filed Sep. 10, 2010 for U.S. Appl. No. 11/809,917.
Final Office Action date mailed Sep. 1, 2010 for U.S. Appl. No. 11/809,538.
Non-Final Office Action date mailed Sep. 7, 2010 for U.S. Appl. No. 11/809,408.
Final Office Action date mailed Sep. 1, 2010 for U.S. Appl. No. 11/809,887.
Final Office Action date mailed Sep. 1, 2010 for U.S. Appl. No. 11/809,883.
Response filed Sep. 15, 2010 for U.S. Appl. No. 11/809,884.
Non-Final Office Action date mailed Sep. 1, 2010 for U.S. Appl. No. 11/809,532.
Response filed Aug. 18, 2010 for U.S. Appl. No. 11/809,881.
Non-Final Office Action date mailed Sep. 2, 2010 for U.S. Appl. No. 11/809,886.
Final Office Action date mailed Aug. 27, 2010 for U.S. Appl. No. 11/809,534.
Response filed Oct. 1, 2010 for U.S. Appl. No. 11/479,751.
Non-Final Office Action date mailed Oct. 4, 2010 for U.S. Appl. No. 11/809,404.
Final Office Action date mailed Oct. 13, 2010 for U.S. Appl. No. 11/809,911.
Final Office Action date mailed Sep. 28, 2010 for U.S. Appl. No. 11/809,537.
Non-Final Office Action date mailed Sep. 17, 2010 for U.S. Appl. No. 11/809,402.
Non-Final Office Action date mailed Sep. 10, 2010 for U.S. Appl. No. 11/809,392.
Non-Final Office Action date mailed Sep. 17, 2010 for U.S. Appl. No. 12/633,361.
Non-Final Office Action date mailed Oct. 1, 2010 for U.S. Appl. No. 11/809,913.
Rce/Response filed Oct. 13, 2010 for U.S. Appl. No. 11/809,401.
Response filed Oct. 20, 2010 for U.S. Appl. No. 11/809,888.
Response filed Sep. 21, 2010 for U.S. Appl. No. 11/809,914.
Advisory Action date mailed Sep. 28, 2010 for U.S. Appl. No. 11/809,914.
Final Office Action date mailed Oct. 19, 2010 for U.S. Appl. No. 11/809,881.
Response filed Dec. 10, 2009 for U.S. Appl. No. 11/479,751.
Final Office Action date mailed Feb. 25, 2010 for U.S. Appl. No. 11/479,751.

Notice of Appeal filed May 25, 2010 for U.S. Appl. No. 11/479,751.
Response filed Dec. 1, 2009 for U.S. Appl. No. 11/809,404.
Final Office Action date mailed Mar. 18, 2010 for U.S. Appl. No. 11/809,404.
Notice of Appeal filed Jun. 18, 2010 for U.S. Appl. No. 11/809,404.
Response filed Nov. 17, 2009 for U.S. Appl. No. 11/809,405.
Notice of Allowance date mailed Mar. 29, 2010 for U.S. Appl. No. 11/809,405.
Non-Final Office Action date mailed Dec. 28, 2009 for U.S. Appl. No. 11/809,396.
Response filed Mar. 4, 2010 for U.S. Appl. No. 11/809,396.
Final Office Action date mailed Mar. 25, 2010 for U.S. Appl. No. 11/809,396.
Response filed Dec. 9, 2009 for U.S. Appl. No. 11/809,911.
Non-Final Office Action date mailed Apr. 14, 2010 for U.S. Appl. No. 11/809,911.
Final Office Action date mailed Sep. 16, 2009 for U.S. Appl. No. 11/583,765.
RCE/Response filed Dec. 15, 2009 for U.S. Appl. No. 11/583,765.
Non-Final Office Action date mailed Jan. 21, 2010 for U.S. Appl. No. 11/583,765.
Response filed Mar. 4, 2010 for U.S. Appl. No. 11/583,765.
Final Office Action date mailed Jun. 8, 2010 for U.S. Appl. No. 11/583,765.
Non-Final Office Action date mailed Dec. 19, 2008 for U.S. Appl. No. 11/894,879.
Response filed May 19, 2009 for U.S. Appl. No. 11/894,879.
Final Office Action date mailed Jul. 15, 2009 for U.S. Appl. No. 11/894,879.
Response filed Sep. 15, 2009 for U.S. Appl. No. 11/894,879.
Advisory Action date mailed Sep. 29, 2009 for U.S. Appl. No. 11/894,879.
Amendment after Final Sep. 29, 2009 for U.S. Appl. No. 11/894,879.
RCE/Response filed Oct. 15, 2009 for U.S. Appl. No. 11/894,879.
Non-Final Office Action date mailed Nov. 17, 2009 for U.S. Appl. No. 11/894,879.
Response filed Mar. 17, 2010 for U.S. Appl. No. 11/894,879.
Interview Summary date mailed Mar. 19, 2010 for U.S. Appl. No. 11/894,879.
Final Office Action date mailed Jun. 9, 2010 for U.S. Appl. No. 11/894,879.
Response filed Dec. 7, 2009 for U.S. Appl. No. 11/809,398.
Final Office Action date mailed Mar. 23, 2010 for U.S. Appl. No. 11/809,398.
Response filed Apr. 21, 2010 for U.S. Appl. No. 11/809,398.
Interview Summary date mailed Apr. 23, 2010 for U.S. Appl. No. 11/809,398.
Final Office Action date mailed May 5, 2010 for U.S. Appl. No. 11/809,398.
Response filed Jan. 13, 2010 for U.S. Appl. No. 11/809,539.
Final Office Action date mailed Apr. 14, 2010 for U.S. Appl. No. 11/809,539.
Response filed Dec. 9, 2009 for U.S. Appl. No. 11/809,912.
Final Office Action date mailed Mar. 30, 2010 for U.S. Appl. No. 11/809,912.
Non-Final Office Action date mailed Oct. 27, 2009 for U.S. Appl. No. 11/583,288.
Response filed Jan. 7, 2010 for U.S. Appl. No. 11/583,288.
Final Office Action date mailed Apr. 7, 2010 for U.S. Appl. No. 11/583,288.
Non Final Office Action date mailed Apr. 12, 2010 for U.S. Appl. No. 11/809,537.
Response filed Sep. 22, 2009 for U.S. Appl. No. 11/809,535.
Final Office Action date mailed Dec. 28, 2009 for U.S. Appl. No. 11/809,535.
RCE/Response filed Mar. 29, 2010 for U.S. Appl. No. 11/809,535.
Non Final Office Action date mailed May 26, 2010 for U.S. Appl. No. 11/809,535.
Response filed Oct. 7, 2009 for U.S. Appl. No. 11/809,917.
Non-Final Office Action date mailed Feb. 4, 2010 for U.S. Appl. No. 11/809,917.
Response filed Apr. 15, 2010 for U.S. Appl. No. 11/809,917.
Final Office Action date mailed Dec. 1, 2009 for U.S. Appl. No. 11/809,402.
Advisory Action date mailed Jan. 29, 2010 for U.S. Appl. No. 11/809,402.
Response filed Mar. 1, 2010 for U.S. Appl. No. 11/809,402.
Advisory Action date mailed Mar. 16, 2010 for U.S. Appl. No. 11/809,402.
Non-Final Office Action date mailed Apr. 15, 2010 for U.S. Appl. No. 11/809,402.
Non-Final Office Action date mailed Mar. 22, 2010 for U.S. Appl. No. 11/809,538.
Response filed Sep. 21, 2009 for U.S. Appl. No. 11/809,408.
Final Office Action date mailed Apr. 21, 2010 for U.S. Appl. No. 11/809,408.
RCE/Response filed Apr. 21, 2010 for U.S. Appl. No. 11/809,408.
Non-Final Office Action date mailed Jun. 10, 2010 for U.S. Appl. No. 11/809,408.
Non-Final Office Action date mailed Feb. 1, 2010 for U.S. Appl. No. 11/809,397.
Non-Final Office Action date mailed Sep. 21, 2009 for U.S. Appl. No. 11/809,887.
Response filed Jan. 12, 2010 for U.S. Appl. No. 11/809,887.
Non-Final Office Action date mailed Apr. 28, 2010 for U.S. Appl. No. 11/809,887.
Amendment after Final filed Sep. 30, 2009 for U.S. Appl. No. 11/809,395.
Advisory Action date mailed Oct. 20, 2009 for U.S. Appl. No. 11/809,395.
Amendment after Final filed Oct. 20, 2009 for U.S. Appl. No. 11/809,395.
Amendment after Final filed Dec. 7, 2009 for U.S. Appl. No. 11/809,395.
Notice of Allowance date mailed Jan. 5, 2010 for U.S. Appl. No. 11/809,395.
RCE/Response filed Sep. 30, 2009 for U.S. Appl. No. 11/809,913.
Non-Final Office Action date mailed Dec. 7, 2009 for U.S. Appl. No. 11/809,913.
Response filed Mar. 4, 2010 for U.S. Appl. No. 11/809,913.
Non-Final Office Action date mailed May 27, 2010 for U.S. Appl. No. 11/809,913.
Final Office Action date mailed Dec. 15, 2009 for U.S. Appl. No. 11/809,407.
RCE/Response filed Feb. 2, 2010 for U.S. Appl. No. 11/809,407.
Non-Final Office Action date mailed Feb. 25, 2010 for U.S. Appl. No. 11/809,407.
Response filed May 25, 2010 for U.S. Appl. No. 11/809,407.
Final Office Action date mailed Nov. 25, 2009 for U.S. Appl. No. 11/809,394.
RCE/Amendment filed Jan. 20, 2010 for U.S. Appl. No. 11/809,394.
Advisory Action date mailed Jan. 20, 2010 for U.S. Appl. No. 11/809,394.
RCE/Amendment filed Jan. 28, 2010 for U.S. Appl. No. 11/809,394.
Non-Final Office Action date mailed Feb. 19, 2010 for U.S. Appl. No. 11/809,394.
Response filed May 19, 2010 for U.S. Appl. No. 11/809,394.
Response filed Sep. 30, 2009 for U.S. Appl. No. 11/809,883.
Final Office Action date mailed Dec. 21, 2009 for U.S. Appl. No. 11/809,883.
RCE/Response filed Mar. 9, 2010 for U.S. Appl. No. 11/809,883.
Non-Final Office Action date mailed Mar. 31, 2010 for U.S. Appl. No. 11/809,883.
Non-Final Office Action date mailed Oct. 1, 2009 for U.S. Appl. No. 11/809,910.
Response filed Dec. 29, 2009 for U.S. Appl. No. 11/809,910.
Notice of Allowance date mailed Apr. 15, 2010 for U.S. Appl. No. 11/809,910.
Non-Final Office Action date mailed Jan. 15, 2010 for U.S. Appl. No. 11/809,393.
Response filed May 5, 2010 for U.S. Appl. No. 11/809,393.
Response filed Dec. 7, 2009 for U.S. Appl. No. 11/809,884.
Final Office Action date mailed Feb. 22, 2010 for U.S. Appl. No. 11/809,884.
RCE/Response filed May 18, 2010 for U.S. Appl. No. 11/809,884.

Non-Final Office Action date mailed Jun. 10, 2010 for U.S. Appl. No. 11/809,884.
Non-Final Office Action date mailed Jan. 21, 2010 for U.S. Appl. No. 11/809,401.
Response filed Apr. 21, 2010 for U.S. Appl. No. 11/809,401.
Response filed Nov. 20, 2009 for U.S. Appl. No. 11/809,915.
Final Office Action date mailed Mar. 9, 2010 for U.S. Appl. No. 11/809,915.
Response filed Nov. 5, 2009 for U.S. Appl. No. 11/809,888.
Non-Final Office Action date mailed Mar. 2, 2010 for U.S. Appl. No. 11/809,888.
Response filed Apr. 29, 2010 for U.S. Appl. No. 11/809,888.
Non-Final Office Action date mailed Feb. 3, 2010 for U.S. Appl. No. 11/809,914.
Response filed Mar. 29, 2010 for U.S. Appl. No. 11/809,914.
Non-Final Office Action date mailed Mar. 26, 2010 for U.S. Appl. No. 11/809,534.
Non-Final Office Action date mailed Oct. 5, 2009 for U.S. Appl. No. 11/809,916.
Response filed Jan. 5, 2010 for U.S. Appl. No. 11/809,916.
Non-Final Office Action date mailed Apr. 1, 2010 for U.S. Appl. No. 11/809,916.
Final Office Action date mailed Dec. 9, 2009 for U.S. Appl. 11/809,403.
Response filed Feb. 2, 2010 for U.S. Appl. No. 11/809,403.
Advisory Action date mailed Feb. 19, 2010 for U.S. Appl. No. 11/809,403.
RCE/Response filed Mar. 8, 2010 for U.S. Appl. No. 11/809,403.
Non-Final Office Action date mailed Mar. 31, 2010 for U.S. Appl. No. 11/809,403.
Non-Final Office Action date mailed Mar. 2, 2010 for U.S. Appl. No. 11/809,532.
Response filed Jun. 2, 2010 for U.S. Appl. No. 11/809,532.
Non-Final Office Action date mailed May 18, 2010 for U.S. Appl. No. 11/809,881.
Non-Final Office Action date mailed Dec. 30, 2009 for U.S. Appl. No. 11/809,885.
Response filed Jan. 25, 2010 for U.S. Appl. No. 11/809,885.
Final Office Action date mailed Apr. 28, 2010 for U.S. Appl. No. 11/809,885.
Response filed May 19, 2009 to Non-Final Office Action date mailed Dec. 19, 2008 for U.S. Appl. No. 11/894,879.
Response filed Sep. 15, 2009 to Final Office Action date mailed Jul. 15, 2009 for U.S. Appl. No. 11/894,879.
RCE/Response filed Sep. 30, 2009 to Final Office Action date mailed Jul. 8, 2009 for U.S. Appl. No. 11/809,913.
Response after Final filed Sep. 30, 2009 to Final Office Action date mailed Aug. 7, 2009 for U.S. Appl. No. 11/809,395.
Non-Final Office Action date mailed Dec. 23, 2010 for U.S. Appl. No. 11/809,914.

* cited by examiner

| Policy for remote network A |
|---|

302 — Allowable content: Network statistics and allowable commands
   Allowable commands: GETS, PUTS, TRAPS 304 — Threshold
   1 message per second 306 — Authentication
   IP address: 188.332.333.222

308 — Circuit identification
   Number 1586

310 — Target Device
   Device X
   Ports 10-16

| 402 | 404 | 406 | 408 |
|---|---|---|---|
| Remote Network A | Remote Network | Policy permissions | Stipulations |
| | | Accessible Target Devices | |
| X | X | | Target Device X |
| | | | Target Device Y |
| X | | | Target Device Z |
| | | | |
| X | | Port Access | |
| | | | Ports 10-16 |
| | X | | Port 10 and 11 |
| | | Accessible IP addresses | |
| X | | | All |
| | X | | 187.238.145.001 |
| | | | 187.238.045.201 |
| | | Circuit identification | |
| | | | All |
| | | | 2548 |
| | | | |
| | | Data Access | |
| X | | | Network statistics/data |
| X | X | | Selective command echo authorization |
| | | | |
| | | Message threshold | (commands or messages)/second |
| X | | | 1 / .5 ms |
| | X | | 1 / 7 |

Process for establishing a policy, please change as needed.

SYSTEM AND METHOD FOR REGULATING MESSAGES BETWEEN NETWORKS

BACKGROUND

Simple Network Management Protocol (SNMP) is an Internet Protocol (IP) based signaling protocol that is used for in-band or out-of-band management of Internet Protocol (IP) devices. In particular, SNMP is used by network management systems for monitoring network-attached devices for conditions that warrant administrative attention. For security purposes most SNMP signaling is encrypted or handled out-of-band whenever possible. Out-of-band communication is the exchange of signal control information in a separate band of the data or voice channel, or on an entirely separate dedicated channel.

In some cases, Ethernet may be used to provide connectivity for access between different carrier networks. The carrier networks may include a host network providing a network service and a customer network that consumes or redistributes the network service. For example, SNMP access to a device, such as a switch or hub, may be controlled by a SNMP server. Each network element communicates with the SNMP signaling collection server. For security reasons, only the owner of the network elements is allowed access to SNMP signaling ports of the SNMP server. This access applies to in-band and in many cases, out-of-band connectivity to the SNMP server. This limitation may be particularly frustrating to the customer network that seeks performance and operational information about the host network.

Because an Ethernet connection is non-synchronous and has no end-to-end signaling to indicate a far end problem, the only way for a customer to understand if a problem exists within a host network is to place a device at the far end that the customer may manage remotely. This alternative is costly and only works when the transport and IP layers are configured correctly. Additionally, the new device introduces another fault point and security issue into the host network. As a result, the customer is unable to monitor statistics and make the limited management changes that the customer is authorized to perform on the host network without assistance from an administrator of the host network.

SUMMARY

To provide added security and effectiveness to messages between networks, a system and method for interconnecting networks. The use of such a system allows a host network to control access to one or more remote networks.

In one embodiment includes a method for interconnecting networks. A message is received from a first network to be communicated to a target device of a second network. Data within the message is identified. A determination is made whether the data is allowable based on a policy. The message is communicated to the target device of the second network in response to determining the data is allowed.

Another embodiment includes a profiler for regulating messages between networks. The system includes a queue for receiving the messages from a remote network. A parser for identifies data within the messages. A comparator determines whether that the data is allowed to be communicated to a target device in a host network based on a policy. The messages are allowed if the messages conform to the policy.

Another embodiment includes a method for establishing a policy for regulating access between a remote network and a host network. A target device and port access is designated for the remote network. Authorized commands are established for the remote network. Message thresholds are specified for the remote network.

BRIEF DESCRIPTION OF THE DRAWINGS

Illustrative embodiments of the present invention are described in detail below with reference to the attached drawing figures, which are incorporated by reference herein and wherein:

FIG. 3 is a an illustration of a policy for a profiler in accordance with illustrative embodiments of the present invention;

FIG. 4 is an illustration of policy permissions in accordance with illustrative embodiments of the present invention;

DETAILED DESCRIPTION OF THE DRAWINGS

The illustrative embodiments of the present invention provide a system and method for regulating messages between a host network and at least one remote network. In many cases capacity of a host network is leased to a remote or customer network in order to allow the remote network to offer various services of the host network as their own. As part of a service agreement, the remote party or customer may have rights to certain statistics and administrative controls on target devices within the host network. The host network may limit the access and availability of the target devices to the remote party for security and stability purposes. The illustrative embodiments provide a profiler for regulating the control and information accessible by the remote networks.

Figure 1:
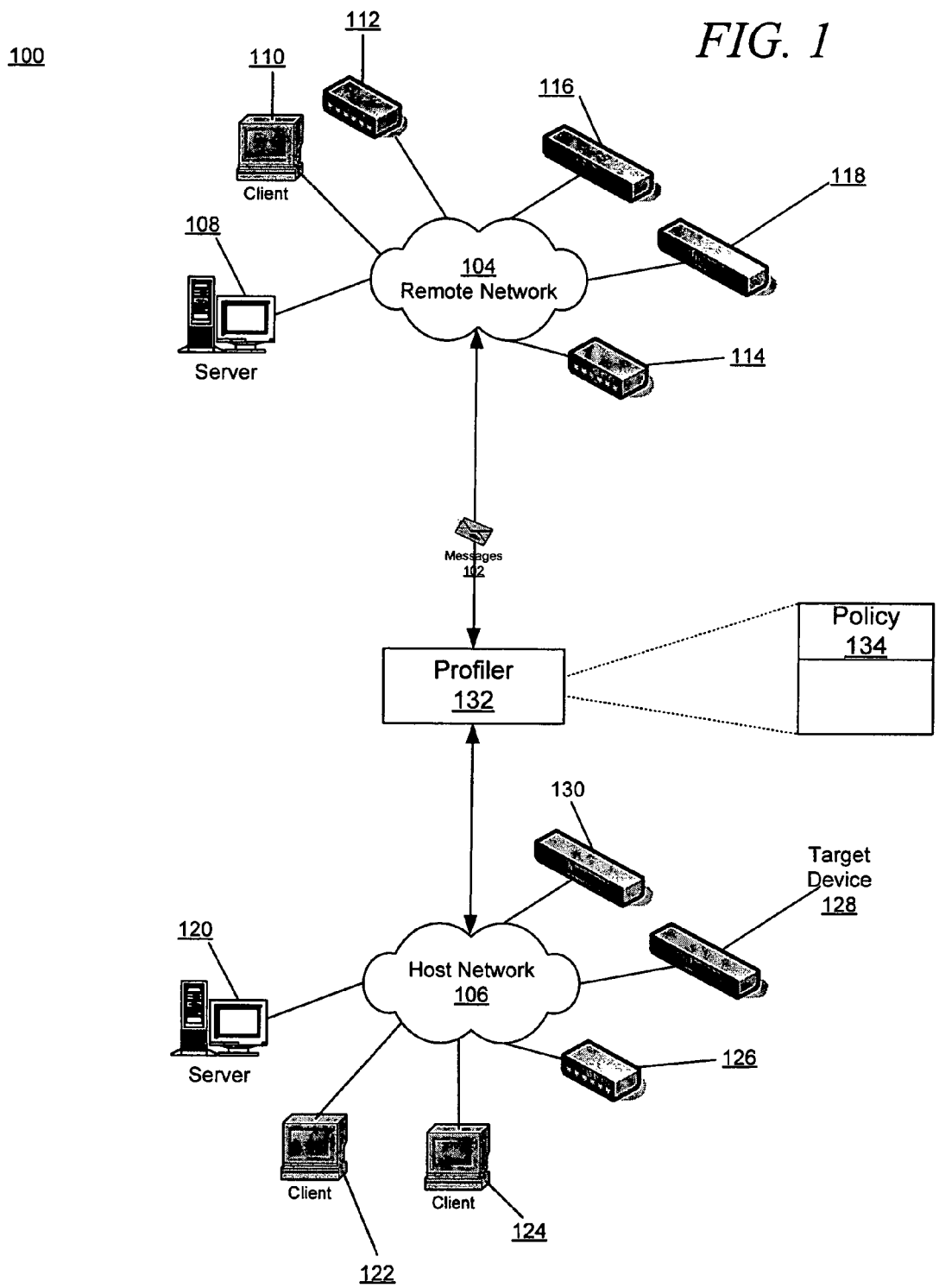
FIG. 1 is an illustration of a messaging system for interconnecting operational networks in accordance with illustrative embodiments of the present invention.

FIG. 1 is an illustration of a messaging system for interconnecting networks in accordance with illustrative embodiments of the present invention. The message control system 100 is a system for regulating messages 102 between a remote network 104 and a host network 106. The remote network 104 and the host network 106 may be telecommunications networks or operational support system (OSS) networks that occur either in-band or out-of-band from the communications path leased from the host network. An OSS network is a network of components including a set of programs that help a communications service provider monitor, control, analyze and manage a telephone or computer network. As the traditional voice telephone systems converges with packet-oriented Internet traffic, including Voice over Internet Protocol (VoIP) technology, broadband applications such as teleconferencing and DSL, more sophisticated OSS systems are used for activities like ordering and tracking network components, usage and traffic patterns, billing and reporting.

In one embodiment shown in FIG. 1, the remote network 104 includes a server 108, a client 110, hubs 112 and 114, and switches 116 and 118. The host network 106 includes a server 120, clients 122 and 124, a hub 126, a target device 128 and a switch 130. However, the remote network 104 and the host network 106 may include numerous nodes, devices, and other elements in any number of different network configurations. The target device 128 is the device accessible by the remote network 104 for requesting information and making permitted configuration changes.

In one embodiment, messages 102 are simple network management protocol (SNMP) messages used to send commands, request performance and operational measurements or statistics, receive fault indicators and test a connection. However, the messages 102 may be any information, script, or command suitable for communicating with or controlling the target device 128. The simple network management protocol is used by network management systems for monitoring network-attached devices for conditions that warrant administrative attention. The host network 106 may have one or more target devices 128 accessible to the remote network 104.

Figure 2:
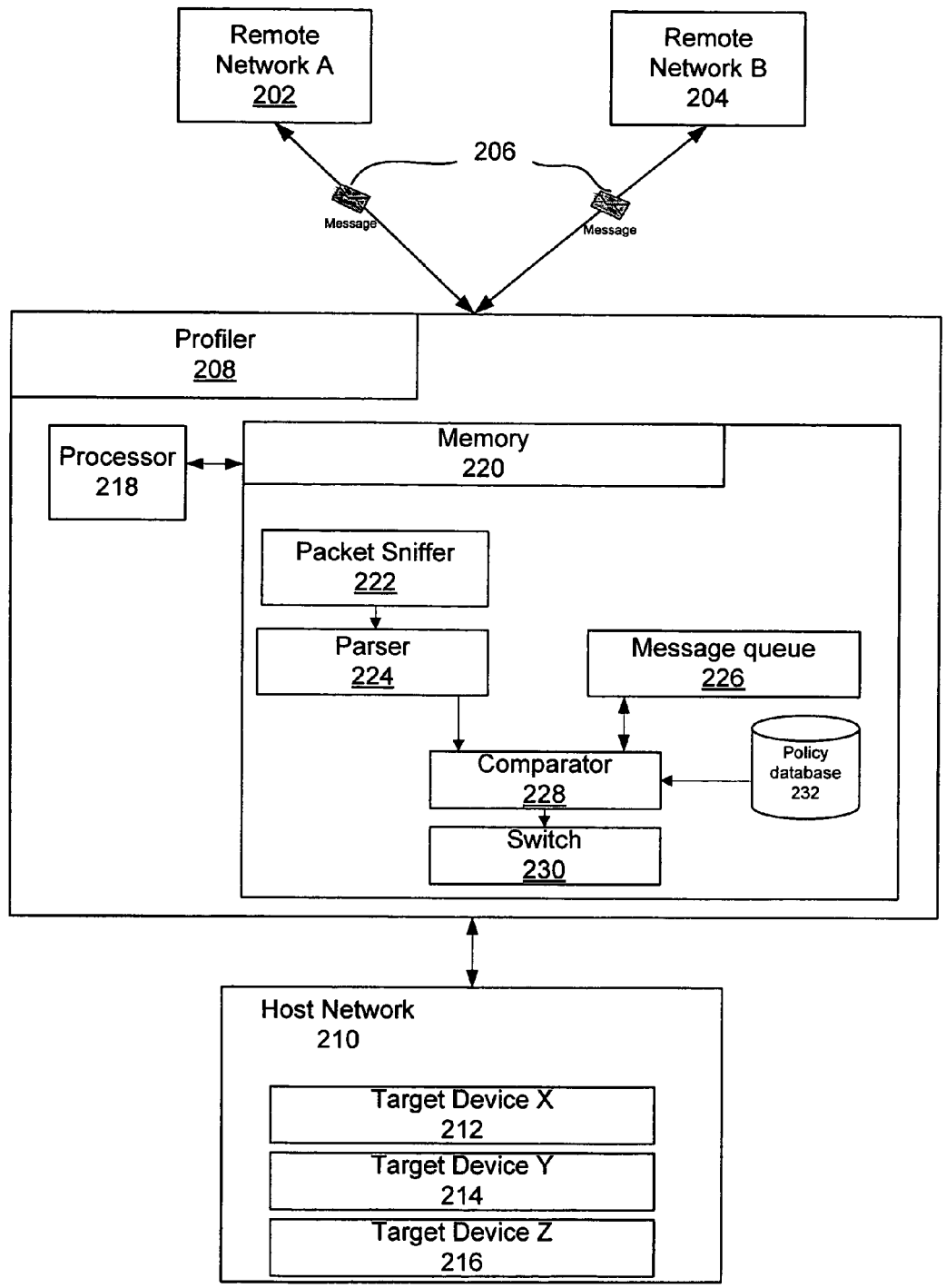
FIG. 2 is a block diagram of a message control system for interconnecting networks in accordance with illustrative embodiments of the present invention.

The host network 106 controls the authentication, content, and throughput threshold of messages 102 using a profiler 132. In one embodiment, the profiler 132 is a specialized firewall or message transfer function that guards access to the host network 106. However, the profiler 132 may be a specialized server, a program application running on a data processing system as shown in FIG. 2, or other hardware element, such as an Application Specific Integrated Circuit (ASIC), suitable for regulating the messages 102 passed to the target device 128. The profiler regulates and otherwise controls messages based on a policy 134. The policy 134 specifies the parameters, rules, permissions, and regulations for remote networks that attempt to access host network 106. Examples of policies and setting permissions for the policy are further shown by FIG. 3 and FIG. 4. In one embodiment, the policy 134 may be stored within the profiler 132 and accessible to administrators using the host network 106. In other embodiments, the policy 134 may be stored on an external database or a component within the host network 106.

FIG. 2 is a block diagram of a message control system for interconnecting networks in accordance with illustrative embodiments of the present invention. The message control system 200 and the described components are similar to the message control system 100 of FIG. 1. In this illustrative example, the message control system includes a remote network A 202 and a remote network B 204. Each remote network is similar to the remote network 104 of FIG. 1. The remote network A 202 and the remote network B 204 send and receive messages 206 through a profiler 208. The profiler 208 regulates and controls the messages 206 that are passed to a host network 210. In embodiments of the present invention, multiple profilers may be used to regulate messages. Multiple profilers may function independently or in combination to regulate messages.

In this example, the host network 210, which is similar to the host network 106 of FIG. 1, includes a target device X 212, a target device Y 214, and a target device Z 216. The remote network A 202 and the remote network B 204 may be allowed to send messages 206 to the target device X 212, the target device Y 214, and the target device Z 216 based on an established policy or permissions set by an administrator of the host network 210.

The profiler 208 may be a hardware device or program application. As shown, the profiler 208 may be a data processing system, such as a server. The profiler 208 includes a processor 218 and a memory 220 in addition to other data processing elements, components, peripherals, and modules. The processor 218 is a processing element for processing instructions and operations as well as coordinating other computing tasks for the profiler 208. The memory 220 may be dynamic memory, such as random access memory (RAM), a hard drive, tape drive or other storage medium. Modules within the memory 220 include a packet sniffer 222, a parser 224, a message queue 226, a comparator 228, a switch 230 and a policy database 232.

The messages 206 received by the profiler 208 are first analyzed by the packet sniffer 222. The packet sniffer 222 is a program that monitors and records activity of the messages 206 entering the profiler 208. Additionally, the packet sniffer 222 acts as a receiving queue so that the messages 206 that are received by the profiler 208 may be analyzed by the components of the memory 220. For example, the packet sniffer 222 records the number and frequency of incoming and outgoing messages. The packet sniffer passes the messages 206 to the parser 224. The parser 224 reads the incoming messages and determines the structure and properties of the data. The parser 224 extracts information from the messages 206 and prepares them for indexing, search, comparison, and retrieval. The parser 224 may also divide a message into data or distinguishable sections which may include authentication, target device, port, content which may include a command or other request, and other information.

Next, the comparator 228 compares the message data against a policy stored in the policy database 232. The policy may be policy 134 of FIG. 1 and is further described by FIG. 3 and FIG. 4. In one embodiment, the policy database 232 may be stored within memory 220. However, the policy database 232 may be part of an external device connected to the profiler 208 or stored in any suitable storage component. The comparator 228 determines whether the message conforms with the policy. One example of policy enforcement performed by the comparator 228 relates to "role based security", which allows specific SNMP messages originated from specified IP addresses to perform "read only" functions exclusively. Another example of a role based profile would be "service assurance" which allows a remote user to setup and tear down loop-back functions on the target devices for testing purposes.

Messages may also be modified for addressing purposes. A host network may provide a circuit identification instead of providing end device IP addresses for the SNMP messages. The circuit identification may be modified to generate an IP address, a port address, a circuit identification or any combination of these elements referred to generally in this application as addresses. In this example, the message sent to the profiler 208 may contain the address of the profile device and a circuit identification. The profiler 208 modifies the message by altering the IP address and port and forwards the message based on the circuit identification number to the IP and port address of the related target device leased or accessed by the remote network. Additionally, if a message is to be passed to multiple profile devices, the host network may connect to a third party host network to provide access to the target device. In this configuration, the circuit identification is exchanged with the third party host network profiler for an IP address and circuit identification. The exchanged information acts as a proxy to relay the SNMP message from the remote network through both the host network and the third party host network.

In some cases, the messages 206 are rejected for not conforming with the policy. In other cases, the message will not conform to the policy because the messages 206 received by the profiler 208 have exceeded a specified threshold. The threshold specifies how often specified messages may be passed to a target device so that the host network 210, and particularly the target devices, are not overwhelmed by excessive messages. The threshold is used by the profiler 208 to pace how often the remote network A 202 and the remote network B 204 may issue or re-issue a message or command.

If the threshold is exceeded, the comparator 228 places the message in the message queue 226 until the message conforms with the parameters of the policy. Once a message in the message queue 226 conforms with a policy in the policy database 232, the message may be passed to the switch 230 to be sent to a specified target device. If multiple duplicate or like messages are stored in the queue 226 the profiler 208 may choose to discard the repeated messages.

FIG. 3 is an illustration of a policy for a profiler in accordance with illustrative embodiments of the present invention. The policy 300 is one embodiment of a policy for a remote network such as the remote network A 202 of FIG. 2. The policy 300 may be the policy 134 used by the profiler 132, both of FIG. 1. The policy 300 includes various sections in this example including allowable content 302, threshold 304, authentication 306, and target devices 308.

The allowable content 302 specifies the types of content that are allowable in a message. The allowable content 302 may include specified commands, reports, statistics, status indicators, and other information that may be used to monitor the performance of the remote network A. In one example, commands that reconfigure a port may be disallowed. However, commands to power down or reinitialize a port may be allowed along with commands to report performance characteristics, packet loss, and bandwidth availability. In the example of FIG. 3, the remote network may be allowed to obtain applicable network statistics and commands including GETS, PUTS, and TRAPS.

The threshold 304 specifies the frequency with which the messages may be received by the target device. In one embodiment, the threshold 304 is measured in messages per second. However, the threshold 304 may specify an interval or frequency term suitable for ensuring that the target device is not overburdened with messages. For example, the threshold 304 may specify that one message may be received per second. The threshold 304 may also indicate a frequency threshold for specific types of messages. For example, messages requesting network statistics may be authorized once every five seconds and messages adjusting port speed may be authorized once every thirty seconds.

Alternatively, the threshold 304 may specify the time required between the execution of a command associated with a message and the receipt of an additional message. If a remote network is sending a number of messages that exceed the threshold, the host network may send a reminder to the device or network administrator specifying the threshold 304. Messages are regulated using the threshold 304 to reduce ineffective message traffic and regulate the remote networks.

In one embodiment, the authentication 306 identifies a remote network or device that may access the host network, and more specifically, a target device in the host network. The authentication 306 ensures that the remote network or device may only access devices authorized by the host network. The authentication 306 may be any authentication scheme, password, or identifier. As shown in the authentication 306, an Internet Protocol address of the sending device within the remote network may be used for authentication purposes.

The circuit identifier 308 specifies a path between a device of the remote network and the target device. The circuit identifier 308 provides the host network a way to provide the remote network access to necessary devices without compromising security by providing Internet Protocol addresses to critical devices. The circuit identifier may be translated by the profiler to generate an Internet Protocol address for the target device. The profiler may use a database, such as the policy database 232 of FIG. 2, to translate the circuit identifier to an Internet Protocol address for routing the message.

In one embodiment, the target device 310 specifies one or more devices within the host network that may be accessed by the remote network. For example, the remote network A 202 may access target device X 212 and target device Z 216, all of FIG. 2. The target device 310 may also specify ports accessible within the authorized target device, such as ports 10-16 of target device X. The target device 310 limits the access of remote networks to specified ports and devices for improved security.

FIG. 4 is an illustration of policy establishment interface in accordance with illustrative embodiments of the present invention. The policy establishment interface 400 may be used to establish the policy 300 of FIG. 3 between a host network and remote network A 402 and remote network B 404. The policy establishment interface 400 may include policy permissions 406 and stipulations 408. The policy establishment interface 400 may be displayed by the profiler 208 of FIG. 2. However, policy establishment interface 400 may be part of a software application displayed to a network administrator suitable configuring or editing policies for one or more remote networks. For example, as a host network establishes agreements or dealings with remote networks, a network administrator may use the policy establishment interface 400 to quickly establish a policy for each remote network that may access the host network.

The policy permissions 406 of FIG. 4 are similar to the sections of policy 300 of FIG. 3. The policy permissions 406 establish the terms and parameters of the policy. The policy permissions 406 shown include accessible target devices, port access, accessible Internet Protocol addresses, circuit identification, data access, and message threshold. The policy permissions 406 may be expanded or reduced, from the example shown, to include as many terms or parameters as are required to effectively create a policy for a remote network. The policy permissions 406 may be set by default, clicking check boxes, entering text or numbers, or using other configuration schemes. The policy establishment interface 400 may be established prior to allowing a remote network to access the host network. Alternatively, the policy establishment interface 400 may be used to edit the access configuration of a remote network that has already been configured.

The stipulations 408 further establish the details of the policy permissions 406. The stipulations 408 are the details of the policy permissions 406. For example, the stipulations 408 specify the target devices and the ports of the target devices that are accessible to remote networks. As a result, the administrator knows that the remote networks should only be accessing those target devices and ports in order to configure network security accordingly.

The stipulations 408 may be narrow or broad based on the type of access the host network wants the profiler to maintain. For example, the remote network A 402 may allow all circuit identifiers for target devices X and Z, but the remote network B may have access only to circuit identification 2548 on target device X. The stipulations 408 may be narrowed to control when, how, by which devices, and for what purpose the target devices in the host network may be accessed. This configuration provides additional assurance that the host network is only being accessed and controlled in accordance with pre-specified guidelines.

The message threshold may be used by the profiler to specify how frequently messages may be passed to the target device as measured in seconds. The policy permissions 406 and stipulations 408 may be custom created or may be set by default based on a type of remote network. For example, a remote network accessing the host network through an established Ethernet transport system using Simple Network Management Protocol may have default parameters for policy permissions 406, such as accessible target devices, port access, data access, and message threshold.

Figure 5:
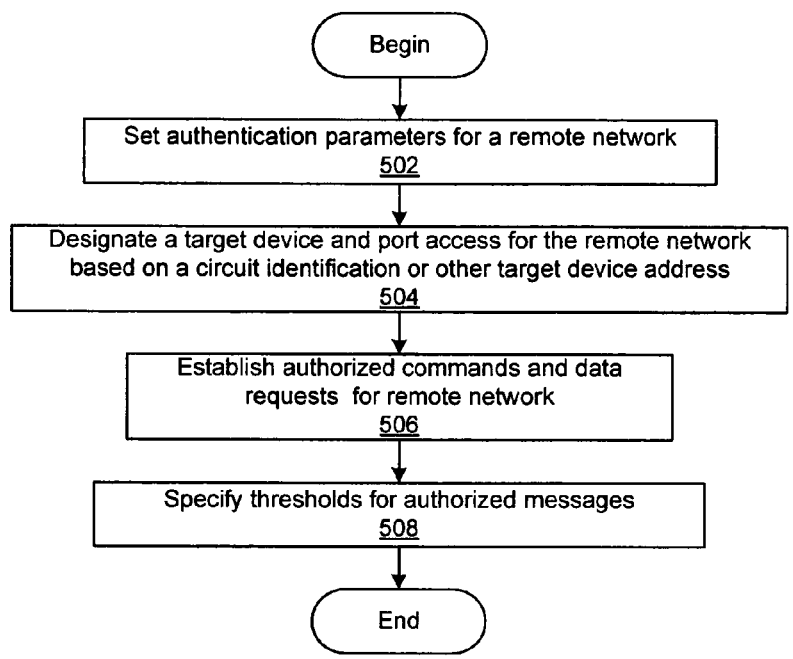
FIG. 5 is a flowchart for a process for establishing a policy in accordance with illustrative embodiments of the present invention.

FIG. 5 is a flowchart for a process for establishing a policy in accordance with illustrative embodiments of the present invention. The process of FIG. 5 may be implemented in a message control system. The process of FIG. 5 is for establishing a policy. In one embodiment, the policy is established using a profiler and stored in policy database. However, the policy may be established in an external database or by an element of the host network.

The process begins by setting authentication parameters for a remote network (step 502). The authentication parameters may be a password, authorized Internet Protocol address, circuit identification or other parameter for determining whether the remote network may access the host network. Next, the process designates a target device and port access for the remote network based on a circuit identification or other target device address. (step 504). During step 504, the remote network is granted access to target devices and ports or components of the target devices.

Next, the process establishes authorized commands and data requests (step 506). Authorized commands establish the content that may be included in a message to the host network. For example, one of the authorized commands may be test control access. Test control access indicates whether the remote network may test the transmission connection to the target device using a feedback loop or other feedback control. For example, a remote network may want to test a transmission path after receiving an error message from the host network. Other commands may be allowed to reconfigure a port, power down, or reinitialize a port. Data requests may include performance data for the target device including packet loss, throughput, bandwidth availability, and errors.

Next, the process specifies thresholds for authorized messages (step 508) with the process terminating thereafter. The message threshold may specify the quantity of messages that may be passed from the remote network to the host network. The message threshold may specify the number of messages that may be received per time period, such as one message ever ten seconds may be received by the target device. The thresholds may vary between different types of messages. For example, data statistics may have a threshold of one message every ten seconds, but commands to reconfigure the port may be allowed every thirty seconds.

Figure 6:
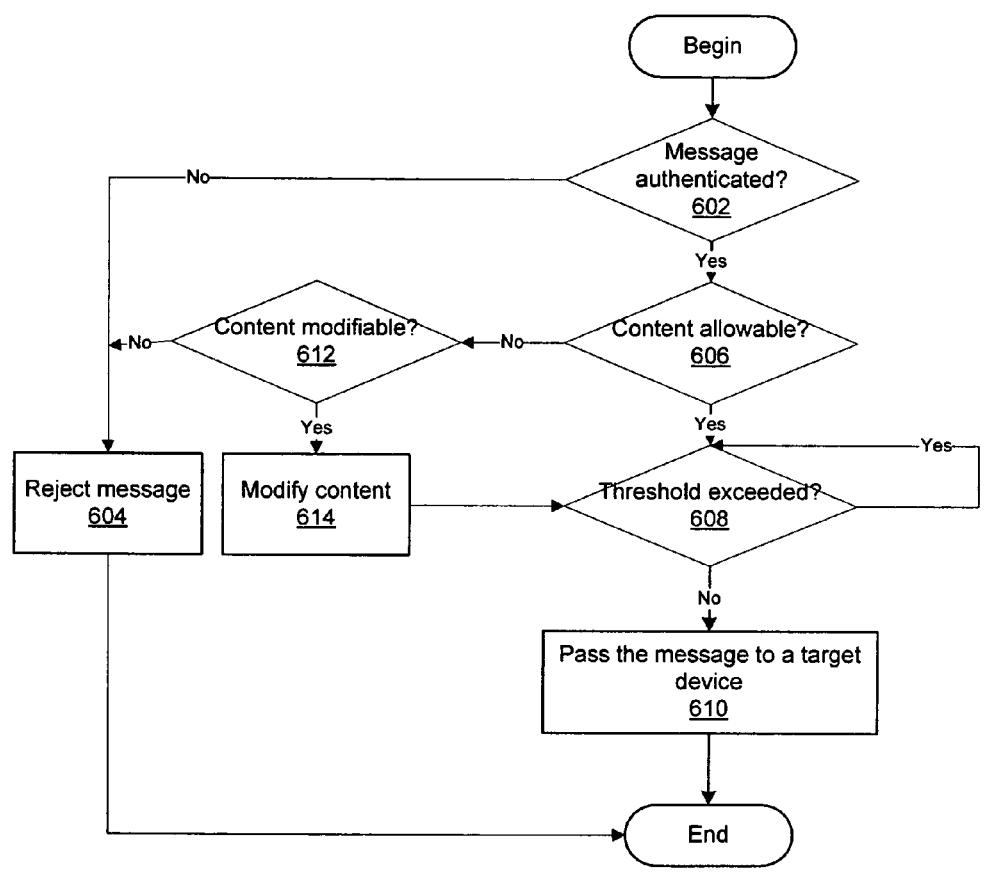
FIG. 6 is a flowchart for a process for passing messages between networks in accordance with illustrative embodiments of the present invention.

FIG. 6 is a flowchart for a process for passing messages between networks in accordance with illustrative embodiments of the present invention. The process of FIG. 6 illustrates the profiling process for each message. The process may be implemented by a profiler, program application, or other data processing system. The determinations of FIG. 6 are made based on a policy established for each remote network. The process of FIG. 6 begins by determining whether a message is authenticated (step 602). The message may be received from a remote network. The message may be authenticated based on an Internet Protocol address of the sending device, circuit identification, password, network key, or other identifier.

If the profiler determines the message is not authenticated, the profiler rejects the message (step 604) with the process terminating thereafter. If the profiler authenticates the message in step 602, the profiler determines whether the content is allowable (step 606). The content of the message is compared against the policy to determine whether the content is allowable. For example, a command from a remote network to reconfigure a device in the host network may be disallowed, but a command to reconfigure a port may be allowed based on the policy. Similarly, a command from a remote network requesting overall network statistics may be disallowed, but a command requesting statistics for the authorized target device may be allowed.

If the content is allowable, the profiler determines whether the threshold is exceeded (step 608). The threshold is also specified by the terms and parameters of a policy. The type of message or commands in the message may specify the applicable threshold. For example, commands reconfiguring a port may be allowed once every ten seconds while commands to request port statistics may be allowed once every thirty seconds. If the threshold is exceeded, the profiler continues to check whether the threshold is exceeded (step 608) until the threshold is no longer exceeded. In another embodiment, the profiler may have a time out threshold at which any messages still being stored in memory or in a queue are discarded to prevent too many messages from accruing. If the profiler determines the threshold is not exceeded in step 608, the profiler passes the message to a target device (step 610) with the process terminating thereafter. The message may be passed or otherwise routed to the target device by a routing device, based on the policy or based on information contained in the message itself. For example, a header of the message may specify the Internet Protocol address of the target device for delivery.

If the profiler determines the content is not allowable in step 606, the profiler determines whether the content is modifiable (step 612). The content is modifiable if the content may be translated, amended, redacted, changed or otherwise reconfigured to conform with the policy. If the content is not modifiable, the profiler rejects the message (step 604). If the content is modifiable in step 612, the profiler modifies the content (step 614). In one example, the content of the message may include two commands, one command is allowed based on the policy and the other command is not. The profiler may modify the content of the message in step 614 by removing the command that is not allowed from the message. Next, the profiler determines whether the threshold is exceeded (step 608) with the process continuing thereafter as previously described.

The illustrative embodiments of the present invention provide a system and method for regulating messages between a host network and at least one remote network. The host network may establish a policy for allowing remote networks to access specified target devices within a host network. As a result, the host network has increased stability and security. Additionally, the host network may regulate the ability of remote networks to access target devices.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A method for interconnecting networks, said method comprising:
    receiving a message from a sending device of a first network to be communicated to a target device of a second network;
    determining an identifier associated with the sending device;
    determining whether the sending device is authorized to communicate with the target device based on the identifier;

responsive to a determination that the sending device is authorized to communicate with the target device, determining a command request contained in the message;

identifying in a policy a list of allowable commands that the sending device may perform on the target device;

determining whether the command request contained in the message is on the list of allowable commands that the sending device may perform on the target device; and responsive to a determination that the command request contained in the message is on the list of allowable commands that the sending device may perform on the target device, communicating the message to the target device of the second network;

responsive to a determination that the command request contained in the message is on the list of allowable commands that the sending device may perform on the target device, determining whether the command request on the target device exceeds a threshold for performing the command request on the target device prior to communicating the message to the target device of the second network; and responsive to the command request on the target device not exceeding the threshold for performing the command request on the target device, communicating the message to the target device of the second network.

2. The method according to claim 1, wherein the command request allows the sending device of the first network to control the target device.

3. The method according to claim 1, wherein the command request commands the target device to report performance characteristics.

4. The method according to claim 1, wherein the message requests network statistics from an operational support system of the second network.

5. The method according to claim 1, wherein the threshold indicates the number of messages that may be received per specified time period.

6. The method according to claim 1, further comprising:
responsive to the command request on the target device exceeding tile threshold for performing the command request on tile target device, placing tile message in a message queue until the threshold for performing the command request on the target device is no longer exceeded.

7. The method according to claim 1, further comprising:
responsive to a determination that the sending device is not authorized to perform the command request on the target device based on the policy, rejecting the message.

8. The method according to claim 1, further comprising:
modifying the message to translate a circuit identification to an address, the circuit identification indicating a path between the sending device and the target device.

9. The method according to claim 1, wherein the command request performs at least one of reconfiguring a port on the target device, powering down the port, or reinitializing the port.

10. The method according to claim 1, wherein the identifier includes at least one of a sending Internet Protocol address and a circuit identification.

11. A system for regulating messages between networks, said system comprising:
a memory component that stores data and instructions; and
a processor configured to execute the instructions to:
determine an identifier associated with a sending device within a first network that sends a message to a target device within a second network;
determine whether the sending device is authorized to communicate with the target device based on the identifier;
responsive to a determination that the sending device is authorized to communicate with the target device; determine a command request contained in the message;
determine whether the sending device is authorized to perform the command request on the target device based on a policy; and
responsive to a determination that the sending device is authorized to perform the command request on the target device, communicate the message to the target device of the second network;
determine whether the command request on the target device exceeds a threshold for performing the command request on the target device prior to communicating the message to the tar et device of the second network; and
responsive to the command request on the target device not exceeding the threshold for performing the command request on the target device, communicate the message to the target device of the second network.

12. The system according to claim 11, wherein the processor is further configured to execute the instructions to modify the message to meet terms of the policy.

13. The system according to claim 11, wherein the processor is further configured to execute the instructions to reject messages that do not conform with the policy.

14. The system according to claim 11, wherein the processor is further configured to execute the instructions to:
determine at least one port on the target device for communicating the message to the target device based on a plurality of allowable ports specified in the policy; and
communicate the message to the target device of the second network using the at least one port.

15. The system according to claim 11, wherein the processor is further configured to execute the instructions to translate a circuit identification indicating a path between the sending device and the target device to an address associated with the target device.

* * * * *